US007767013B2

(12) United States Patent
Uozumi et al.

(10) Patent No.: US 7,767,013 B2
(45) Date of Patent: Aug. 3, 2010

(54) NON-AQUEOUS PIGMENT INK

(75) Inventors: Shunsuke Uozumi, Ibaraki-ken (JP);
Kazuyoshi Shioiri, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 481 days.

(21) Appl. No.: 11/819,658

(22) Filed: Jun. 28, 2007

(65) Prior Publication Data

US 2008/0011192 A1    Jan. 17, 2008

(30) Foreign Application Priority Data

Jul. 12, 2006    (JP) ............................. P2006-191674

(51) Int. Cl.
*C09D 11/00* (2006.01)
(52) U.S. Cl. ................. 106/31.6; 106/31.75; 106/31.86
(58) Field of Classification Search ................ 106/31.6, 106/31.75, 31.86
See application file for complete search history.

(56) References Cited

U.S. PATENT DOCUMENTS 4,224,212 A    9/1980    Topham

| | | |
|---|---|---|
| 2002/0005146 A1 | 1/2002 | Palumbo et al. |
| 2004/0242726 A1 | 12/2004 | Waki et al. |
| 2006/0096498 A1 | 5/2006 | Tsujimura et al. |
| 2006/0106132 A1 | 5/2006 | Ma et al. |
| 2008/0229974 A1* | 9/2008 | Uozumi et al. ........... 106/31.75 |

FOREIGN PATENT DOCUMENTS

| | | |
|---|---|---|
| JP | 09-151342 | 6/1997 |
| JP | 11-140343 | 5/1999 |
| WO | 00/24503 | 5/2000 |
| WO | 01/51566 A1 | 7/2001 |
| WO | 2005/040291 A1 | 5/2005 |

* cited by examiner

*Primary Examiner*—Jerry Lorengo
*Assistant Examiner*—Veronica Faison Gee
(74) *Attorney, Agent, or Firm*—The Nath Law Group; Joshua B. Goldberg; Brian S. Sun

(57) ABSTRACT

A non-aqueous pigment ink includes a colorant and a non-aqueous solvent, wherein the colorant is a pigment complex of a pigment, a dispersant and a polymer compound, the polymer compound contains 2 or more primary and/or secondary amino groups within each molecule, and the dispersant contains 2 or more reactive functional groups within each molecule that exhibit reactivity with the amino groups of the polymer compound.

8 Claims, No Drawings

NON-AQUEOUS PIGMENT INK

TECHNICAL FIELD

The present invention relates to a non-aqueous pigment ink, and particularly to a non-aqueous pigment ink that is suitable for use in inkjet recording systems.

BACKGROUND ART

Inkjet recording systems are printing systems in which printing is conducted by spraying a liquid ink with a high level of fluidity from fine nozzles, and adhering that ink to a recording medium such as a sheet of paper. These systems are comparatively cheap, and offer the advantage of enabling high-resolution, high-quality images to be printed rapidly and with minimal noise, and consequently continue to spread rapidly.

The coloring materials for the inks used in these inkjet recording systems can be broadly classified into materials that use pigments and materials that use dyes. Of these, there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. In an aqueous ink, because an aqueous solvent and water act as the ink medium, finely dispersing a pigment within this medium and then maintaining the stability of that dispersion is extremely difficult.

As a result, aqueous pigment inks have been proposed in which the pigment is encapsulated, thereby enabling dispersion within an aqueous medium (Japanese Patent Laid-Open Publication No. H09-151342, Japanese Patent Laid-Open Publication No. H11-140343). However, because the inks are water-based, the problem of poor water resistance is unavoidable.

In contrast, non-aqueous inks that do not use water for the ink solvent, including solvent-based inks that use a volatile solvent as the main constituent and oil-based inks that use a non-volatile solvent as the main constituent, are now attracting considerable attention. Non-aqueous inks exhibit superior drying properties to aqueous inks, and also offer excellent printability.

These non-aqueous inks typically comprise a non-aqueous solvent, a binder resin, and a pigment and the like. One problem associated with inkjet pigment inks is the problem of ink blockages within the printing head. Methods that have been proposed to overcome this problem include increasing the quantity of solvent, and adjusting the viscosity of the ink to a viscosity appropriate for inkjet spraying.

However, increasing the quantity of solvent causes a reduction in the resin concentration, and because the resin is more likely to penetrate into the recording medium together with the solvent, the binder strength becomes inadequate and the pigment fixation tends to deteriorate. These tendencies are particularly marked in those cases where the recording medium is a readily penetrable paper such as plain paper.

On the other hand, if the resin quantity is increased in order to improve the fixation of the pigment to the recording medium and the scratch resistance, then the viscosity of the ink increases, which increases the likelihood of nozzle blockages.

Accordingly, current inks are prepared with either the ink viscosity or the pigment fixation given priority.

DISCLOSURE OF INVENTION

The inventors of the present invention also found that, compared with aqueous inks, non-aqueous inks exhibit a higher level of affinity between the coloring material and the solvent, and consequently a problem arises in that when the ink bonds to paper, the coloring material does not remain at the paper surface, but rather penetrates into the interior of the paper with the solvent, causing a reduction in the ink density at the printed surface (the upper surface) of the printed item, and increasing the likelihood of strike-through at the non-printed surface (the underside). Furthermore, in the case of pigment inks, a pigment dispersant is usually added to improve the dispersibility of the pigment, but increasing the blend quantity of the dispersant in order to ensure favorable storage stability tends to cause an associated deterioration in the scratch resistance.

Accordingly, an object of the present invention is to provide a non-aqueous pigment ink which exhibits superior storage stability and pigment dispersibility, and which is able to maintain favorable levels of print density and scratch resistance for the printed item even when the recording medium is a readily penetrable medium such as plain paper.

The present invention relates to a non-aqueous pigment ink comprising a colorant and a non-aqueous solvent, wherein the colorant is a pigment complex of a pigment, a dispersant and a polymer compound, the polymer compound comprises 2 or more primary and/or secondary amino groups within each molecule, and the dispersant comprises 2 or more reactive functional groups within each molecule that exhibit reactivity with the amino groups of the polymer compound.

Another aspect of the present invention relates to a printed item printed using the non-aqueous pigment ink according to the aspect of the present invention described above.

Yet another aspect of the present invention relates to a colorant obtained by: adding a polymer compound comprising 2 or more primary and/or secondary amino groups within each molecule to a pigment dispersion comprising a pigment, a dispersant comprising 2 or more reactive functional groups within each molecule that exhibit reactivity with primary and/or secondary amino groups, and a non-aqueous solvent; and reacting the dispersant with the polymer compound.

BEST MODE FOR CARRYING OUT THE INVENTION

A non-aqueous pigment ink according to the present invention (hereafter also referred to as simply "the ink") uses, as a colorant, a complex of 3 materials, namely a pigment, a dispersant, and a polymer compound that undergoes a reaction with the reactive functional groups within the dispersant, thereby forming chemical bonds to the dispersant. As a result, the ink according to the present invention exhibits high levels of storage stability and pigment dispersibility, has excellent discharge stability that prevents the occurrence of nozzle blockages, and is able to maintain superior levels of print density and scratch resistance for the printed items even when the recording medium is a readily penetrable medium such as plain paper.

The reasons for these observations, although only speculative, are thought to include the factors described below. Namely, conventional pigments are dispersed within the solvent by undergoing adsorption to adsorption sites within the dispersant, but the pigment can also readily desorb from these adsorption sites, whereas in this colorant, it is thought that the polymer compound that is chemically bonded (cross-linked) to the dispersant encircles the pigment adsorbed to the dispersant, making the pigment less likely to desorb from the dispersant, and therefore enhancing the pigment dispersibility. At the same time, it is thought that because the dispersion efficiency of the dispersant also increases, the quantity used of the dispersant can be kept at a suitable level, enabling any deterioration in the scratch resistance caused by an excessive quantity of dispersant to be avoided.

Moreover, this polymer compound contains 2 or more amino groups within each molecule, and is itself a highly polar compound, and consequently it is thought that by encircling the pigment with this polymer, the solvent release of the pigment from the non-aqueous solvent can be enhanced, and as a result, a higher print density can be obtained and the problem of ink strike-through to the underside of the printed item can be prevented.

The colorant contained within the ink according to the present invention is a pigment complex comprising a pigment, a dispersant and a polymer compound. More specifically, the polymer compound comprises 2 or more primary and/or secondary amino groups within each molecule, the dispersant comprises reactive functional groups that exhibit reactivity with these amino groups, and within the pigment complex, the amino groups of the polymer compound react with the reactive functional groups of the dispersant, such that the polymer compound and the dispersant exist in a mutually bonded state. It is thought that because both of these components contain a plurality of reactive sites, bonding of the two components occurs at 2 or more locations within each molecule, meaning the polymer compound at least partially covers the pigment adsorbed to the dispersant. In other words, it is surmised that the polymer compound functions, at least partially, as a shell component, forming an encapsulated pigment or some similar state, and this represents a preferred embodiment of the pigment complex in the present invention.

Examples of pigments that can be used include organic pigments such as azo-based pigments, phthalocyanine-based pigments, dye-based pigments, condensed polycyclic pigments, nitro-based pigments, and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese, and nickel, as well as metal oxides and sulfides, yellow ocher, ultramarine, and iron blue pigments; and carbon blacks such as furnace carbon black, lamp black, acetylene black, and channel black. These pigments may be used either alone, or in combinations of two or more different pigments.

From the viewpoint of ensuring favorable dispersibility and storage stability, the average particle size of the pigment is preferably no greater than 300 nm, is even more preferably no greater than 150 nm, and is most preferably 100 nm or smaller. In this description, the average particle size of the pigment refers to the value measured using a dynamic light scattering particle size distribution measurement apparatus LB-500 manufactured by Horiba, Ltd.

The quantity of the pigment within the ink is typically within a range from 0.01 to 20% by weight, and from the viewpoints of print density and ink viscosity, is preferably from 1 to 15% by weight, and even more preferably from 5 to 10% by weight.

The dispersant is a reactive pigment dispersant, and comprises, as reactive functional groups, at least two functional groups within each molecule that exhibit reactivity with primary or secondary amine groups. By incorporating a plurality of reactive functional groups in this manner, the pigment-covering properties (encapsulating property) of the polymer compound can be favorably realized. This dispersant is preferably a polymer dispersant.

Examples of the reactive functional groups include glycidyl groups, oxetane groups and isocyanate groups, and of these, from the viewpoint of reactivity, glycidyl groups are the most desirable.

In addition to the reactive functional groups described above, the dispersant preferably also comprises lipophilic groups that function as solvent affinity sites, and other functional groups (pigment-adsorbing functional groups) that function as pigment adsorption sites, and is preferably a polymer dispersant that comprises these other groups.

The lipophilic groups (solvent affinity groups) function as solvent affinity sites for the non-aqueous solvent, and are preferably hydrocarbon groups of 7 or more carbon atoms, and even more preferably straight-chain alkyl groups of 12 or more carbon atoms (such as a dodecyl group, tridecyl group, tetradecyl group, pentadecyl group, hexadecyl group, heptadecyl group, octadecyl group, nonadecyl group, eicosanyl group, heneicosanyl group or docosanyl group), and/or branched-chain alkyl groups of 8 or more carbon atoms (such as an isooctyl group, 2-ethylhexyl group, isostearyl group or tert-octyl group), and/or aromatic ring-containing groups of 7 or more carbon atoms (such as a benzyl group or phenylethyl group).

It is thought that as a result of the existence of these long-chain alkyl groups or aromatic ring-containing groups, a steric hindrance effect is obtained, thereby suppressing aggregation between particles, and enabling the pigment complex that functions as the colorant to remain stably dispersed within the solvent. Moreover, if the polymer compound was to undergo reaction (cross-linking) in a manner that caused linking between a plurality of dispersant molecules, then this would actually result in an undesirable aggregation of the colorant particles, but it is thought that the presence of the above lipophilic groups causes steric hindrance that reduces the likelihood of reactions of the polymer compound that lead to bridging between dispersant molecules, thereby promoting reaction at the plurality of sites within a single dispersant molecule.

The pigment-adsorbing functional groups are groups that function as pigment adsorption sites, and may be selected from amongst basic functional groups such as primary, secondary and tertiary amino groups, and nitrogen heterocyclic compounds; acidic functional groups such as carboxyl groups (acids, or salts or esters thereof), sulfo groups (acids, or salts or esters thereof), and glycidyl groups; and aromatic ring-containing groups such as benzyl groups. For example, in those cases where the pigment is a carbon black, because the pigment contains acidic sites, amino groups, and particularly tertiary amino groups, are preferred as the pigment-adsorbing functional groups within the dispersant.

A polymer that comprises these types of lipophilic groups and pigment-adsorbing functional groups in addition to the aforementioned reactive functional groups is preferably a copolymer that comprises a monomer (M1) containing a lipophilic group, a monomer (M2) containing a pigment-adsorbing functional group, and a monomer (M3) containing a reactive functional group that exhibits reactivity with an amino group. Moreover, acrylic copolymers wherein each of these monomers (M1, M2 and M3) is an acrylic monomer are particularly desirable. Here, the term "monomer" also includes macromonomers that are high molecular weight monomers and contain a polymerizable functional group.

For example, there are no particular restrictions on the monomer (M1) containing a lipophilic group, provided it is a monomer that contains a functional group with a pigment-dispersing action, and suitable examples include (meth)acrylates containing one of the lipophilic groups exemplified above (such as a long-chain alkyl group or aromatic ring-containing group) at the ester portion (such as lauryl(meth)acrylate, isostearyl(meth)acrylate, and benzyl(meth)acrylate), or macromonomers thereof. These monomers may be used alone, or a combination of two or more different M1 monomers can be used.

For example, there are no particular restrictions on the monomer (M2) containing a pigment-adsorbing functional group, provided it is a monomer that contains a functional group with a pigment-adsorbing action, such as an amino group, carboxyl group, glycidyl group or benzyl group. Specific examples of suitable monomers include (meth)acrylate monomers such as dimethylaminoethyl(meth)acrylate, (meth)acrylic acid and glycidyl(meth)acrylate, as well as styrene, N-methylpyrrolidone, or styrene macromonomers. These monomers may be used alone, or a combination of two or more different M2 monomers can be used.

An example of a commercially available product that represents a macromonomer corresponding with the aforementioned monomer M1 is "Macromonomer AS-6" (a methacrylate with a polystyrene chain at the ester portion) manufactured by Toagosei Co., Ltd.

An example of a commercially available product that represents a macromonomer corresponding with the aforementioned monomer M2 is "Macromonomer AA-6" (a methacrylate with a polymethyl methacrylate chain at the ester portion) manufactured by Toagosei Co., Ltd.

There are no particular restrictions on the monomer (M3) containing a reactive functional group, provided it contains a functional group that exhibits reactivity with a primary or secondary amino group, although monomers such as glycidyl (meth)acrylate and isocyanatoethyl(meth)acrylate are particularly favorable.

In a particularly preferred configuration, the polymer dispersant is a copolymer comprising: (M1) a (meth)acrylate containing a straight-chain alkyl group of 12 or more carbon atoms and/or a branched-chain alkyl group of 8 or more carbon atoms, (M2) a (meth)acrylate containing a tertiary amino group, and (M3) glycidyl(meth)acrylate.

In a polymer dispersant comprising the aforementioned monomers M1, M2 and M3, from the viewpoint of preventing gelling during polymerization, the respective proportions of M1, M2 and M3 (l, m and n respectively), wherein l+m+n=1, are preferably such that m<0.3, and $0.01 \leq n \leq 0.2$.

The form of the copolymer may be a typical random copolymer, or a copolymer comprising partial block units, and there are no particular restrictions on the copolymer regularity.

The copolymer comprising the monomers M1, M2 and M3 may also include other monomers capable of copolymerization with these monomers. Examples of such other monomers include (meth)acrylate esters such as methyl(meth)acrylate, ethyl(meth)acrylate, and propyl(meth)acrylate; styrene-based monomers such as styrene and α-methylstyrene; as well as maleate esters, fumarate esters, acrylonitrile, methacrylonitrile, vinyl acetate, and α-olefins. These monomers may be used either alone, or in combinations of two or more different monomers.

In addition, a pigment dispersant different from those exemplified above can also be used, provided it contains functional groups that exhibit reactivity with primary or secondary amino groups.

In those cases where the dispersant is a polymer compound, from the viewpoint of ensuring favorable ink filterability, the molecular weight (weight average molecular weight) of the polymer dispersant is preferably within a range from approximately 15,000 to 35,000, and is even more preferably from approximately 20,000 to 30,000.

The monomers described above can be polymerized easily using a conventional radical copolymerization. The reaction system is preferably conducted as either a solution polymerization or a dispersion polymerization.

In order to ensure that the molecular weight of the polymer dispersant following polymerization falls within the above preferred range, the use of a chain transfer agent during polymerization is effective. Examples of suitable chain transfer agents include thiols such as n-butyl mercaptan, lauryl mercaptan, stearyl mercaptan and cyclohexyl mercaptan.

Examples of suitable polymerization initiators include conventional heat polymerization initiators, including azo compounds such as AIBN (azobisisobutyronitrile), and peroxides such as t-butyl peroxybenzoate and t-butylperoxy-2-ethylhexanoate (Perbutyl O, manufactured by NOF Corporation).

Petroleum-based solvents (such as aroma-free (AF) solvents) and the like can be used as the polymerization solvent used in the solution polymerization. This polymerization solvent is preferably one or more solvents selected from amongst those solvents that can be used, as is, for the non-aqueous solvent for the product ink.

In those cases where the M3 monomer contains a glycidyl group, the polymerization temperature is preferably not too high, in order to prevent ring-opening of the glycidyl group during the polymerization, and conducting the polymerization at a temperature of 65° C. or lower is preferred. For this reason, the use of 2,2'-azobis(2,4-dimethylvaleronitrile) (V-65, manufactured by Wako Pure Chemical Industries, Ltd.), which functions as an oil-soluble, low temperature, azo-based polymerization initiator, is particularly suitable. Photopolymerization initiators that generate radicals upon irradiation with an activated energy beam can also be used.

During the polymerization reaction, typically employed polymerization inhibitors, polymerization accelerators and dispersants and the like may also be added to the reaction system.

From the viewpoint of pigment dispersibility, the blend quantity of the dispersant within the ink, reported as a weight ratio relative to one part of the pigment, is preferably within a range from approximately 0.05 to 1.0, and even more preferably from 0.1 to 0.5.

Relative to the total weight of the ink, the quantity of the dispersant is preferably within a range from 0.5 to 10% by weight, and is even more preferably from 1 to 5% by weight.

Next is a description of the polymer compound that comprises 2 or more primary and/or secondary amino groups within each molecule.

This polymer compound comprises primary and/or secondary amino groups which function as amino groups that undergo reaction with the reactive functional groups of the dispersant. Particularly favorable examples of this type of polymer compound include basic polymer electrolytes such as polyethyleneimine, polyvinylamine and polyvinylpyridine. Of these, the use of polyethyleneimine is particularly preferred.

From the viewpoints of stability and achieving improved print density on plain paper, the molecular weight (weight average molecular weight) of the polymer compound such as polyethyleneimine is preferably at least 500, whereas from the viewpoint of storage stability, the molecular weight is preferably no higher than 15,000, and a molecular weight within a range from 600 to 10,000 is particularly desirable.

This weight average molecular weight is most preferably within a range from 800 to 2,000, as values within this range yield a large improvement in print density, and have a flow point that is no higher than −5° C., meaning low-temperature storage stability is favorable.

Commercially available polyethyleneimines can be used, and suitable examples include SP-006, SP-012, SP-018 and SP-200, manufactured by Nippon Shokubai Co., Ltd., and Lupasol FG, Lupasol G20 Waterfree and Lupasol PR8515, manufactured by BASF Corporation.

From the viewpoint of improving the print density of the printed item, the blend quantity of the polymer compound such as polyethyleneimine containing 2 or more amino groups within each molecule is preferably sufficient to provide 3 or more equivalents of the polymer compound for each equivalent of the aforementioned reactive functional groups of the dispersant, whereas from the viewpoints of ink viscosity and storage stability, this blend quantity is preferably no more than 10 equivalents, and blend quantities within a range from 5 to 8 equivalents are particularly preferred, with a quantity of approximately 6 equivalents being the most desirable.

Relative to the total weight of the ink, the quantity of the polymer compound is preferably within a range from 0.1 to 5% by weight, and is even more preferably from 0.5 to 1.5% by weight.

The pigment complex that functions as the colorant in the present invention can be obtained, for example, by adding the polymer compound comprising 2 or more amino groups within each molecule to a pigment dispersion comprising the pigment, the dispersant that comprises 2 or more reactive functional groups within each molecule that exhibit reactivity with amino groups, and a non-aqueous solvent, and then reacting the reactive functional groups within the dispersant with the amino groups of the polymer compound. The non-aqueous solvent (or diluent solvent) used in this case is the same as the non-aqueous solvent (described below) that is incorporated within the ink, and in those cases where the dispersant is synthesized by solution polymerization in the manner described above, is the same as the polymerization solvent.

The pigment dispersion comprising the pigment, the dispersant and the non-aqueous solvent is preferably obtained by mixing the 3 components together, and then dispersing the pigment using an appropriate dispersion device such as a ball mill or beads mill.

In those cases where polyethyleneimine is used as the polymer compound, polyethyleneimine is only slightly soluble or substantially insoluble in most general-purpose non-aqueous inkjet solvents. As a result, the reaction (crosslinking) between the polymer compound and the dispersant is preferably conducted using a device such as a beads mill that is capable of imparting shear to the mixture, so that the reaction occurs under this state of shear application. In cases where the non-aqueous solvent used is able to dissolve the polymer compound such as polyethyleneimine, this type of shear is unnecessary, although the reaction is preferably conducted under stirring.

The reaction between the polymer compound and the dispersant is preferably conducted under heat, as heating generally improves the solubility of the polymer compound and increases the reaction efficiency. For example, the reaction is preferably conducted under heating at 60° C. or higher, although if the temperature is too high, then pigment aggregation caused by the heating becomes increasingly likely, and consequently the temperature is preferably no higher than approximately 100° C. Moreover, if the two components undergo reaction at too low a temperature, then the mixing of the components must be conducted under cooling in order to prevent the reaction from occurring during mixing, which is actually inefficient. Accordingly, the two components preferably react under a state of applied heat. In other words, the reactive functional groups of the dispersant are preferably functional groups that exhibit reactivity with amino groups under heat, and the reaction between the dispersant and the polymer compound is preferably a thermal reaction (a reaction that occurs under heat).

The average particle size of the obtained pigment complex colorant is preferably no greater than 500 nm, even more preferably no greater than 200 nm, and is most preferably 150 nm or less. On the other hand, in order to suppress strike-through within the printed item, the average particle size is preferably at least approximately 50 nm. Here, the average particle size of the pigment complex refers to the value measured using a dynamic light scattering particle size distribution measurement apparatus LB-500 manufactured by Horiba, Ltd.

The non-aqueous solvent refers to a non-polar organic solvent or polar organic solvent for which the 50% distillation point is at least 150° C. The "50% distillation point" is measured in accordance with JIS K0066 "Test Methods for Distillation of Chemical Products" and refers to the temperature at which 50% by weight of the solvent is evaporated.

For example, examples of suitable non-polar organic solvents include aliphatic hydrocarbon solvents, alicyclic hydrocarbon solvents, and aromatic hydrocarbon solvents. Specific examples of suitable aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by Nippon Oil Corporation; and Isopar G, Isopar H, Isopar L, Isopar M, Exxsol D40, Exxsol D80, Exxsol D100, Exxsol D130 and Exxsol D140, all manufactured by Exxon Mobil Corporation. Specific examples of suitable aromatic hydrocarbon solvents include Nisseki Cleansol G (alkylbenzene) manufactured by Nippon Oil Corporation, and Solvesso 200 manufactured by Exxon Mobil Corporation.

Examples of suitable polar organic solvents include ester-based solvents, alcohol-based solvents, higher fatty acid-based solvents, ether-based solvents, and mixtures thereof. Specific examples include ester-based solvents such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol and oleyl alcohol; higher fatty acid-based solvents such as isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether, and propylene glycol dibutyl ether.

These non-polar solvents may be used either alone, or in mixtures of two or more different solvents.

Of these, in the case of higher alcohols, the solubility of the polymer compound such as polyethyleneimine can be increased by adding a higher alcohol, especially a higher alcohol containing a branch chain, which negates the aforementioned necessity for applying shear during the reaction. However, from the viewpoint of increasing the print density of the printed item, use of a higher alcohol causes a slight reduction in the printed item density and a slight increase in the degree of strike-through. Accordingly, for these reasons, a higher alcohol need not necessarily be used, and if used in combination with another solvent, the quantity of the higher alcohol is preferably restricted to no more than 3 times the weight of the polyethyleneimine.

The blend quantity of the colorant (solid fraction) within the ink is preferably within a range from 0.1 to 25% by weight, even more preferably from 1 to 20% by weight, and is most preferably from 5 to 15% by weight.

Besides the colorant and non-aqueous solvent described above, the ink may also include, as required, any of the various additives typically used within the field, provided the inclusion of these additives does not impair the object of the present invention.

Specific examples of these additives include anionic surfactants, cationic surfactants, amphoteric surfactants, non-ionic surfactants, or polymer-based, silicone-based or fluorine-based surfactants, which are added as pigment dispersants, antifoaming agents, or surface tension reducing agents or the like.

An electrolyte may be added to the ink to regulate the viscosity of the ink. Examples of suitable electrolytes include sodium sulfate, potassium hydrogen phosphate, sodium citrate, potassium tartrate and sodium borate, and two or more of these electrolytes may also be used in combination. Compounds such as sulfuric acid, nitric acid, acetic acid, sodium hydroxide, potassium hydroxide, ammonium hydroxide and triethanolamine may also be used as ink thickening assistants.

By adding an antioxidant, oxidation of the ink components can be prevented, enabling the storage stability of the ink to be improved. Examples of suitable antioxidants include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented, enabling the storage stability of the ink to be improved. Examples of suitable preservatives include isothiazolinone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine- and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

Moreover, by adding a polyoxyethylene alkylamine (an ethylene oxide adduct of an aliphatic amine: $C_nH_{2n+1}N[(EO)_xH][(EO)_yH]$) to the ink, the discharge stability can be further improved, and a higher level of print density can be achieved when printing to plain paper. In the above general formula, EO represents an oxyethylene group, and x and y each represent, independently, and integer of 0 or greater, provided that both are not zero.

Examples of suitable alkylamines include laurylamine, stearylamine, and oleylamine. Of these, from the viewpoints of ensuring even more favorable levels of discharge stability and low-temperature storage stability, laurylamine is preferred.

In terms of achieving superior discharge stability, high print density on plain paper, and superior storage stability under low temperature conditions, the number of mols of added ethylene oxide (the combined total of x and y in the above general formula) is preferably within a range from 2 to 8, and is even more preferably from 3 to 7.

In those cases where a polyoxyethylene alkylamine is added, from the viewpoints of achieving superior discharge stability and high print density on plain paper, the blend quantity of the polyoxyethylene alkylamine within the ink is preferably within a range from 1.0 to 5.0% by weight.

The ideal range for the ink viscosity varies depending on factors such as the diameter of the print head nozzles and the discharge environment, but at 23° C. is typically within a range from 5 to 30 mPa·s, and even more preferably from 5 to 15 mPa·s, and a viscosity of approximately 10 mPa·s is ideal for use with inkjet recording devices. Here, the viscosity is measured at 23° C. by raising the shear stress from 0 Pa at a rate of 0.1 Pa/s, and refers to the measured value at 10 Pa.

A printed item according to the present invention is an item printed using the ink of the present invention described above. By using an ink according to the present invention, a printed item with superior print density and excellent scratch resistance is obtained.

There are no particular restrictions on the printing method, although conducting the printing using an inkjet recording apparatus is preferred. The inkjet printer may employ any of various printing systems, including piezo systems, electrostatic systems and thermal systems. In those cases where an inkjet recording apparatus is used, the ink according to the present invention is discharged from the inkjet head based on a digital signal, and the discharged ink droplets are adhered to a recording medium.

EXAMPLES

As follows is a more detailed description of the present invention based on a series of examples, although the present invention is in no way limited by these examples. In the following description, the units "% by weight" are recorded simply as "%".

<Synthesis of Dispersant>

In a 500 ml four-necked flask were mixed 26.3 g of behenyl methacrylate (manufactured by NOF Corporation), 47.4 g of 2-ethylhexyl methacrylate (manufactured by Wako Pure Chemical Industries, Ltd.), 9.2 g of dimethylaminoethyl methacrylate (manufactured by Wako Pure Chemical Industries, Ltd.) and 4.6 g of glycidyl methacrylate (manufactured by NOF Corporation), 1.29 g of V-65 (manufactured by Wako Pure Chemical Industries, Ltd.) as a polymerization initiator, 0.97 g of stearyl mercaptan (manufactured by Wako Pure Chemical Industries, Ltd.) as a chain transfer agent and 260.2 g of AF7 (AF solvent No. 7, a naphthene-based solvent, manufactured by Nippon Oil Corporation) were added, and the resulting mixture was reacted under reflux for 5 hours, under temperature conditions of 61° C.±3° C., thereby yielding a dispersant solution A (a 25% AF7 solution). Following reaction, a small quantity of methoquinone(p-methoxyphenol) was added as a polymerization inhibitor.

Subsequently, using the same method as above, various dispersant solutions B to F (each a 25% AF7 solution) were obtained using the monomers shown in Table 1. In the case of the dispersant solution E, 1.29 g of V-70 (manufactured by Wako Pure Chemical Industries, Ltd.) was used as the polymerization initiator, and the reaction was conducted at 40° C.±3° C. In Table 1, the manufacturer of each monomer reagent is also shown.

TABLE 1

| | Abbreviated name | Common name | Dispersant solution | | | | | |
|---|---|---|---|---|---|---|---|---|
| | | | A | B | C | D | E | F |
| Blended monomer/g | VMA | behenyl methacrylate (NOF Corporation) | 26.3 | | 26.3 | | 26.3 | |
| | LMA | lauryl methacrylate (NOF Corporation) | | 73.7 | 47.4 | | | 76.0 |
| | iSMA | isostearyl methacrylate (Shin-Nakamura Chemical Co., Ltd.) | | | | 69.1 | | |
| | 2-EHMA | 2-ethylhexyl methacrylate (Wako Pure Chemical Industries, Ltd.) | 47.4 | | | | 46.9 | |
| | DM | dimethylaminoethyl methacrylate (Wako Pure Chemical Industries, Ltd.) | 9.2 | 9.2 | | 9.2 | 9.2 | 11.5 |
| | DE | diethylaminoethyl methacrylate (Wako Pure Chemical Industries, Ltd.) | | | 9.2 | | | |
| | GM | glycidyl methacrylate (NOF Corporation) | 4.6 | 4.6 | 4.6 | 9.2 | | |
| | MOI | 2-isocyanatoethyl methacrylate (Showa Denko K. K.) | | | | | 5.0 | |

Example 1

In a 250 ml polypropylene container were mixed 37.7 g of the above dispersant solution A, 23.8 g of a black pigment MA11 (a carbon black, manufactured by Mitsubishi Chemical Corporation, primary particle size: 29 nm) and 57.5 g of IOP (isooctyl palmitate, manufactured by Nikko Chemicals Co., Ltd.) as a diluent solvent, zirconia beads were then added to the mixture, and dispersion was conducted for 60 minutes using a rocking mill (manufactured by Seiwa Technical Lab Co., Ltd.), thereby yielding a pigment dispersion.

The 250 ml PP container containing the above pigment dispersion was held for 30 minutes, without removing the zirconia beads, in a 70° C. constant temperature chamber, thereby heating the container contents to 70° C. Subsequently, 1.9 g of Epomin SP-012 (a polyethyleneimine (PEI) with a molecular weight of approximately 1,200, manufactured by Nippon Shokubai Co., Ltd.) was added to the container, and dispersion was conducted for a further 50 minutes using the rocking mill. The zirconia beads were then removed, and the container contents were passed through 3.0 μm and 0.8 μm membrane filters to remove any contaminants or coarse particles, thereby yielding a colorant solution.

To 35.6 g of the thus obtained colorant solution were added 40.4 g of AF7 (as described above) and 24.0 g of IOP (as described above), thus yielding an ink of the example 1.

Examples 2 to 9, Comparative Examples 1 to 2

Using each of the dispersant solutions and polymer compounds shown in Table 2, colorant solutions were produced in the same manner as the example 1. In the comparative example 2, no reaction was conducted with a polymer compound, and the mixture obtained by adding the pigment and the solvent to the dispersant solution was used as the colorant solution with no further modification. In Table 2, the product name, molecular weight, and manufacturer are also shown for each PEI.

TABLE 2

| | | | Colorant solution | | | | | |
|---|---|---|---|---|---|---|---|---|
| | | | Example 1 | Example 2 | Example 3 | Example 4 | Example 5 | Example 6 |
| Dispersant solution/g | | A | 37.7 | | 37.7 | | | |
| | | B | | 37.7 | | | | |
| | | C | | | | 37.7 | 37.7 | |
| | | D | | | | | | 37.7 |
| | | E | | | | | | |
| | | F | | | | | | |
| Pigment/g | MA11 | Carbon black (Mitsubishi Chemical Corporation) | 23.8 | 23.8 | 23.8 | 23.8 | 23.8 | 23.8 |
| Solvent/g | IOP | Isooctyl palmitate (Nikkol) | 57.5 | 57.5 | 57.5 | 57.5 | 57.5 | 57.5 |
| Polymer compound/g | SP-006 | PEI (Mw: 600) (Nippon Shokubai Co., Ltd.) | | | | | | |
| | Lupasol FG | PEI (Mw: 800) (BASF) | | | | 2.4 | | |
| | SP-012 | PEI (Mw: 1200) (Nippon Shokubai Co., Ltd.) | 1.9 | | | | 2.4 | 3.8 |
| | SP-018 | PEI (Mw: 1800) (Nippon Shokubai Co., Ltd.) | | | 2.4 | | | |
| | Lupasol PR8515 | PEI (Mw: 2000) (BASF) | | | | | 2.4 | |
| | SP-200 | PEI (Mw: 10,000) (Nippon Shokubai Co., Ltd.) | | | | | | |

TABLE 2-continued

|  |  |  | Colorant solution | | | | |
| --- | --- | --- | --- | --- | --- | --- | --- |
|  |  |  | Example 7 | Example 8 | Example 9 | Comparative example 1 | Comparative example 2 |
| Dispersant solution/g |  | A | 37.7 | 37.7 |  |  | 37.7 |
|  |  | B |  |  |  |  |  |
|  |  | C |  |  |  |  |  |
|  |  | D |  |  |  |  |  |
|  |  | E |  |  | 37.7 |  |  |
|  |  | F |  |  |  | 37.7 |  |
| Pigment/g | MA11 | Carbon black (Mitsubishi Chemical Corporation) | 23.8 | 23.8 | 23.8 | 23.8 | 23.8 |
| Solvent/g | IOP | Isooctyl palmitate (Nikkol) | 57.5 | 57.5 | 57.5 | 57.5 | 57.5 |
| Polymer compound/g | SP-006 | PEI (Mw: 600) (Nippon Shokubai Co., Ltd.) | 1.9 |  |  |  |  |
|  | Lupasol FG | PEI (Mw: 800) (BASF) |  |  |  |  |  |
|  | SP-012 | PEI (Mw: 1200) (Nippon Shokubai Co., Ltd.) |  |  | 1.9 | 1.9 |  |
|  | SP-018 | PEI (Mw: 1800) (Nippon Shokubai Co., Ltd.) |  |  |  |  |  |
|  | Lupasol PR8515 | PEI (Mw: 2000) (BASF) |  |  |  |  |  |
|  | SP-200 | PEI (Mw: 10,000) (Nippon Shokubai Co., Ltd.) |  |  | 1.9 |  |  |

Using each of the obtained colorant solutions, the non-aqueous solvents shown in Table 3 were added, yielding inks of the examples and comparative examples. The ink of the comparative example 1 was not evaluated because following reaction between the dispersant solution F and the polymer compound within the colorant solution, the pigment underwent marked aggregation, but with the exception of the ink of the comparative example 1, each ink was able to be prepared with a suitable viscosity and pigment particle size for use as an inkjet ink.

The initial viscosity of each ink was measured at 23° C. immediately following preparation of the ink, by raising the shear stress from 0 Pa at a rate of 0.1 Pa/s, and refers to the measured value obtained at 10 Pa. The initial particle size refers to the particle size of the pigment complex measured immediately following ink preparation, using a dynamic light scattering particle size distribution measurement apparatus LB-500 manufactured by Horiba, Ltd.

The properties of each ink were evaluated using the methods described below.

<Filterability>

Each ink was passed through a 3 μm filter of diameter 90 mm, and the quantity of ink that passed through the filter was evaluated.

Inks for which the quantity that passed through a single filter was at least 30 g were evaluated as A, inks for which the quantity was at least 10 g but less than 30 g were evaluated as B, and inks for which the quantity was less than 10 g were evaluated as C.

<Storage Stability>

Each ink was placed in a sealed container and stored for 4 weeks in an atmosphere at 70° C., the variation in the viscosity of the ink was measured, and the result of that measurement was then evaluated in the manner described below.

((Viscosity after 4 weeks×100)/(Initial viscosity value))−100 (%)

Inks for which the viscosity variation was less than 5% were evaluated as A, inks for which the viscosity variation was at least 5% but less than 10% were evaluated as B, and inks for which the viscosity variation was at least 10% were evaluated as C.

<Low-temperature Storage Stability>

Each ink was placed in a sealed container and stored for 3 days in an atmosphere at −5° C., the variation in the viscosity of the ink was measured, and the result of that measurement was then evaluated in the manner described below.

((Viscosity after 3 days×100)/(Initial viscosity value))−100 (%)

Inks for which the viscosity variation was less than 5% were evaluated as A, inks for which the viscosity variation was at least 5% but less than 10% were evaluated as B, and inks for which the viscosity variation was at least 10% were evaluated as C.

<Print Density of Printed Item>

Each ink was loaded into an inkjet recording apparatus HC5000 (manufactured by Riso Kagaku Corporation), and subsequently printed onto plain paper (Riso light paper (manufactured by Riso Kagaku Corporation)), yielding a printed item. The HC5000 is a system that uses a 300 dpi line-type inkjet head (in which the nozzles are aligned with an approximately 85 μm spacing therebetween), wherein the paper is transported in a sub-scanning direction perpendicular to the main scanning direction (the direction along which the nozzles are aligned) while printing is conducted.

The OD value of the printed surface (upper surface) of the thus obtained printed item was measured, and values of 1.1 or greater were evaluated as A, values of at least 1.0 but less than 1.1 were evaluated as B, and values of less than 1.0 were evaluated as C.

<Printed Item Strike-through>

The non-printed surface (the underside) of the printed items obtained above were inspected visually, and items with no noticeable strike-through were evaluated as A, items with slight strike-through were evaluated as B and items with noticeable strike-through were evaluated as C.

The results are shown in Table 3.

TABLE 3

|  |  | Example 1 | Example 2 | Example 3 | Example 4 | Example 5 | Example 6 |
|---|---|---|---|---|---|---|---|
|  | Colorant solution/g | 35.6 | 35.7 | 35.7 | 35.7 | 35.7 | 36.1 |
| Non-aqueous | AF7 | 40.4 | 43.0 | 43.0 | 43.0 | 42.5 | 45.0 |
| solvent/g | IOP | 24.0 | 21.3 | 21.3 | 21.3 | 21.8 | 18.9 |
|  | Number of parts of pigment/parts by weight | 7.0 | 7.0 | 7.0 | 7.0 | 7.0 | 7.0 |
| Properties | Viscosity (initial)/mPa · s | 0.1 | 9.9 | 10.2 | 10.3 | 10.2 | 10.2 |
|  | Particle size (initial)/nm | 93.8 | 93.8 | 95.8 | 95.1 | 94.1 | 98.6 |
| Evaluation | Filterability | A | A | A | A | B | B |
| items | Storage stability | A | A | A | A | A | A |
|  | Low-temperature storage stability | A | A | A | A | A | A |
|  | Printed item print density | A | A | A | A | A | A |
|  | Printed item strike-through | A | A | A | A | A | A |

|  |  | Example 7 | Example 8 | Example 9 | Comparative example 1 | Comparative example 2 |
|---|---|---|---|---|---|---|
|  | Colorant solution/g | 35.6 | 35.6 | 35.6 | 35.6 | 35.0 |
| Non-aqueous | AF7 | 35.5 | 59.4 | 40.4 | (Aggregated) | 35.0 |
| solvent/g | IOP | 28.9 | 5.0 | 24.0 |  | 30.0 |
|  | Number of parts of pigment/parts by weight | 7.0 | 7.0 | 7.0 |  | 7.0 |
| Properties | Viscosity (initial)/mPa · s | 10.0 | 10.2 | 10.2 |  | 10.2 |
|  | Particle size (initial)/nm | 94.5 | 99.6 | 96.6 |  | 94.5 |
| Evaluation | Filterability | A | B | A |  | A |
| items | Storage stability | A | A | B |  | A |
|  | Low-temperature storage stability | A | B | A |  | A |
|  | Printed item print density | B | A | A |  | C |
|  | Printed item strike-through | A | A | A |  | C |

The present disclosure relates to subject matter contained in Japanese Patent Application No. 2006-191674 filed on Jul. 12, 2006, the disclosure of which is expressly incorporated herein by reference in its entirety.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous pigment ink comprising a colorant and a non-aqueous solvent,
wherein
the colorant is a pigment complex of a pigment, a dispersant and a polymer compound,
the polymer compound comprises two or more primary and/or secondary amino groups within each molecule, and
the dispersant comprises two or more reactive functional groups within each molecule that exhibit reactivity with the amino groups of the polymer compound, wherein the reactive functional groups of the dispersant are selected from the group consisting of a glycidyl group, an oxetane group and a mixture thereof.

2. The non-aqueous pigment ink according to claim 1, wherein
the polymer compound is a polyethyleneimine with a weight average molecular weight within a range from 500 to 15,000.

3. The non-aqueous pigment ink according to claim 1, wherein the reactive functional groups of the dispersant are glycidyl groups.

4. The non-aqueous pigment ink according to claim 1, wherein the dispersant is a polymer dispersant that further comprises lipophilic groups that function as solvent affinity sites, and pigment-adsorbing functional groups that function as pigment adsorption sites.

5. The non-aqueous pigment ink according to claim 4, wherein the lipophilic groups of the polymer dispersant are hydrocarbon groups containing 7 or more carbon atoms, and the pigment-adsorbing functional groups are amino groups.

6. The non-aqueous pigment ink according to claim 4, wherein the polymer dispersant is a copolymer comprising a monomer (M1) containing a lipophilic group, a monomer (M2) containing a pigment-adsorbing functional group, and a monomer (M3) containing a reactive functional group that exhibits reactivity with a primary and/or secondary amino group.

7. A printed item, printed using the non-aqueous pigment ink according to claim 1.

8. A colorant obtained by: adding a polymer compound comprising two or more primary and/or secondary amino groups within each molecule to a pigment dispersion comprising a pigment, a dispersant comprising two or more reactive functional groups within each molecule that exhibit reactivity with primary and/or secondary amino groups, wherein the reactive functional groups of the dispersant are selected from the group consisting of a glycidyl group, an oxetane group and a mixture thereof, and a non-aqueous solvent; and reacting the dispersant with the polymer compound.

* * * * *